United States Patent
Surpi

(10) Patent No.: US 10,072,933 B1
(45) Date of Patent: Sep. 11, 2018

(54) DECOUPLING OF ACCELEROMETER SIGNALS

(71) Applicant: Lytx, Inc., San Diego, CA (US)

(72) Inventor: Gabriela Surpi, San Diego, CA (US)

(73) Assignee: Lytx, Inc., San Diego, CA (US)

(*) Notice: Subject to any disclaimer, the term of this patent is extended or adjusted under 35 U.S.C. 154(b) by 0 days.

(21) Appl. No.: 15/481,379

(22) Filed: Apr. 6, 2017

(51) Int. Cl.
| | |
|---|---|
| *G01C 21/00* | (2006.01) |
| *G01C 21/16* | (2006.01) |
| *G05B 13/02* | (2006.01) |
| *G01S 19/47* | (2010.01) |

(52) U.S. Cl.
CPC .......... *G01C 21/165* (2013.01); *G01S 19/47* (2013.01); *G05B 13/024* (2013.01)

(58) Field of Classification Search
CPC ...... G01C 21/165; G05B 13/024; G01S 19/47
See application file for complete search history.

(56) References Cited

U.S. PATENT DOCUMENTS

| | | | | |
|---|---|---|---|---|
| 6,926,373 | B2 * | 8/2005 | Burkhard | B60T 8/173 303/158 |
| 2012/0029803 | A1 * | 2/2012 | Yasushi | B60R 16/0236 701/123 |
| 2012/0245758 | A1 * | 9/2012 | Mizuta | B60W 30/182 701/1 |
| 2015/0051785 | A1 * | 2/2015 | Pal | G01P 15/18 701/29.1 |
| 2015/0184348 | A1 * | 7/2015 | Stracke, Jr. | G01C 21/20 702/141 |
| 2017/0092021 | A1 * | 3/2017 | Nielsen | G07C 5/0808 |
| 2017/0349148 | A1 * | 12/2017 | Bojanowski | B60Q 1/20 |
| 2018/0053405 | A1 * | 2/2018 | de Azevedo | G08G 1/0133 |

* cited by examiner

*Primary Examiner* — Hussein A El Chanti
(74) *Attorney, Agent, or Firm* — Van Pelt, Yi & James LLP

(57) ABSTRACT

A system for decoupling accelerometer signals includes an interface and a processor. The interface is configured to receive accelerometer data and receive coarse behavior data. The processor is configured to determine a coarse acceleration based at least in part on the coarse behavior data, determine a perturbation acceleration using the coarse acceleration and the accelerometer data, and determine an anomalous event based at least in part on the perturbation acceleration.

21 Claims, 21 Drawing Sheets

DECOUPLING OF ACCELEROMETER SIGNALS

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. Sensor data can then be transmitted to an external reviewing system. Anomalous event types include accident anomalous events, impact anomalous events, maneuver anomalous events, location anomalous events, proximity anomalous events, vehicle malfunction anomalous events, driver behavior anomalous events, or any other anomalous event types. Acceleration data can be used to recognize certain anomalous events (e.g., accident or impact anomalous events), however, acceleration data from an accelerometer comprises acceleration signals from a plurality of acceleration sources, creating a problem where it is difficult to recognize acceleration signals indicating an anomalous event.

BRIEF DESCRIPTION OF THE DRAWINGS

Various embodiments of the invention are disclosed in the following detailed description and the accompanying drawings.

DETAILED DESCRIPTION

Figure 1:
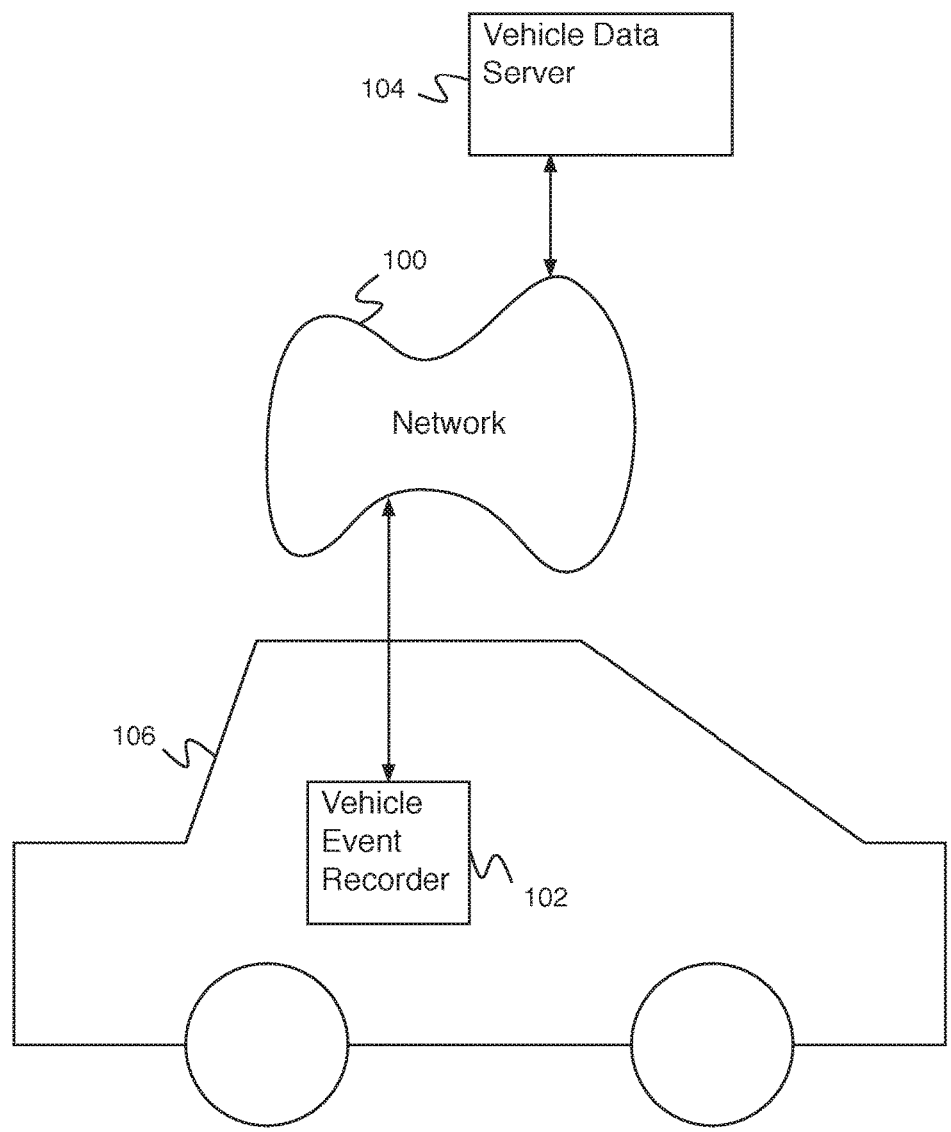
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for decoupling accelerometer signals is disclosed. The system comprises an interface and a processor. The interface is configured to receive accelerometer data and receive coarse behavior data. The processor is configured to determine a coarse acceleration based at least in part on the coarse behavior data, determine a perturbation acceleration data using the coarse acceleration data and the accelerometer data, and determine an anomalous event based at least in part on the perturbation acceleration. In some embodiments, the system for decoupling accelerometer signals additionally comprises a memory coupled to the processor and configured to provide the processor with instructions.

In some embodiments, a system for decoupling accelerometer signals comprises a system for separating a coarse acceleration and a perturbation acceleration. Accelerometer data from an accelerometer is received by the system for decoupling accelerometer signals. The accelerometer data comprises accelerometer data from a plurality of different sources, including a coarse acceleration and a perturbation acceleration. A coarse acceleration comprises acceleration imposed upon the vehicle for the purpose of guiding the vehicle on its travel path, for example, accelerating from stop to travel speed, accelerating from travel speed back to stop, turning corners, lane changes, etc. A perturbation acceleration comprises external acceleration sources, for example, a rough road, small objects (e.g., pebbles) knocked against the vehicle body, and anomalous events (e.g., a collision). The system for decoupling accelerometer signals separates the coarse acceleration from the perturbation acceleration by using coarse behavior data to determine the coarse acceleration. Coarse behavior data comprises data describing the coarse traveling behavior of the vehicle—for instance global positioning system (e.g., GPS) position data or vehicle speed data. A coarse acceleration is derived from the coarse behavior data and processed to make it compatible with the accelerometer data (e.g., the data is filtered, the data sample rate is changed, the data is scaled or aligned, etc.). The coarse acceleration is then subtracted from the accelerometer data to determine the perturbation acceleration. Anomalous events can be determined from the perturbation acceleration directly (e.g., by determining whether the perturbation acceleration magnitude crosses a threshold or matches a pattern) or by removing further acceleration components (e.g., rough road acceleration) first. In some embodiments, acceleration in the forward-backward direction and acceleration in the lateral direction are processed independently (e.g., a coarse acceleration is determined in each direction and used to determine a perturbation acceleration in each direction).

FIG. 1 is a block diagram illustrating an embodiment of a system including a vehicle event recorder. In the example shown, vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, proximity sensors, a global positioning system (e.g., GPS), outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In some embodiments, vehicle event recorder 102 comprises a system for detecting risky behavior. In various embodiments, vehicle event recorder 102 is mounted on vehicle 106 in one or more of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100. Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In various embodiments, vehicle data server 104 is located at a colocation center (e.g., a center where equipment, space, and bandwidth are available for rental), at a cloud service provider, or any at other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. In some embodiments, vehicle event recorder 102 comprises a system for determining risky events.

Figure 2:
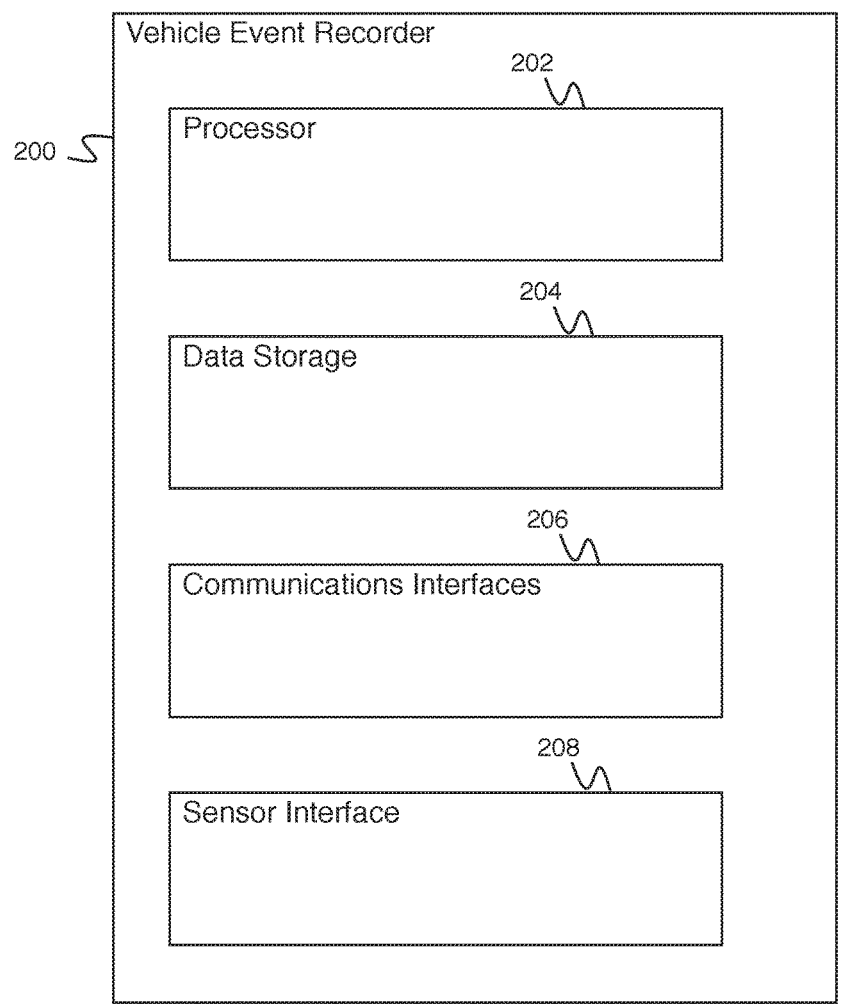
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, and for reading data via sensor interface 208. In various embodiments, processor 202 comprises a processor for determining a vehicle characterization, determining a vehicle identifier, determining a maintenance item, or for any other appropriate purpose. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, driver scores, or any other appropriate data. In various embodiments, communications interfaces 206 comprises one or more of a GSM interface, a CDMA interface, a LTE interface, a WiFi™ interface, an Ethernet interface, a Universal Serial Bus (USB) interface, a Bluetooth™ interface, an Internet interface, or any other appropriate interface. Sensor interface 208 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, sensor interface 208 comprises an on-board diagnostics (OBD) bus (e.g., society of automotive engineers (SAE) J1939, SAE J1708/J1587, on board diagnostics standard (OBD-II), controller area network vehicle bus (CAN BUS), etc.). In some embodiments, vehicle event recorder 200 communicates with vehicle state sensors via the OBD bus. In some embodiments, vehicle event recorder 200 communicates with a vehicle data server via communications interfaces 206. In various embodiments, vehicle event recorder 200 transmits vehicle state sensor data, accelerometer data, speed data, maneuver data, audio data, video data, event data, or any other appropriate data to the vehicle data server.

In some embodiments, vehicle event recorder 200 comprises a system for determining events from data. In some embodiments, vehicle event recorder 200 stores data in a time-delay buffer (e.g., a buffer holding the last 30 seconds of data, the last 5 minutes of data, etc.). In some embodiments, data is deleted from the time-delay buffer after the time-delay period (e.g., a buffer holding the last 30 seconds of data deletes data as soon as it is more than 30 seconds old). In some embodiments, in the event an event is determined from data in the time-delay buffer, data associated with the event is copied from the time-delay buffer into a long-term storage. In various embodiments, event information and associated data is stored, processed, uploaded immediately, uploaded at a later time, provided to an administrator, or handled in any other appropriate way. In some embodiments, data is continually stored (e.g., and not deleted after a time-delay period). In some embodiments, in the event an event is determined from continuously stored data, an event flag is stored associated with the continuously stored data. In some embodiments, data storage is modified based at least in part on an event flag (e.g., data is stored at higher resolution in the vicinity of an event flag). In some embodiments, event data is extracted from continuously stored data. In some embodiments, event data is uploaded (e.g., immediately, at a later time, etc.). In some embodiments, flag data (e.g., an event type, an event severity, etc.) is uploaded. In some embodiments, flag metadata (e.g., a list of flags, a flag identifier, etc.) is uploaded.

Figure 3:
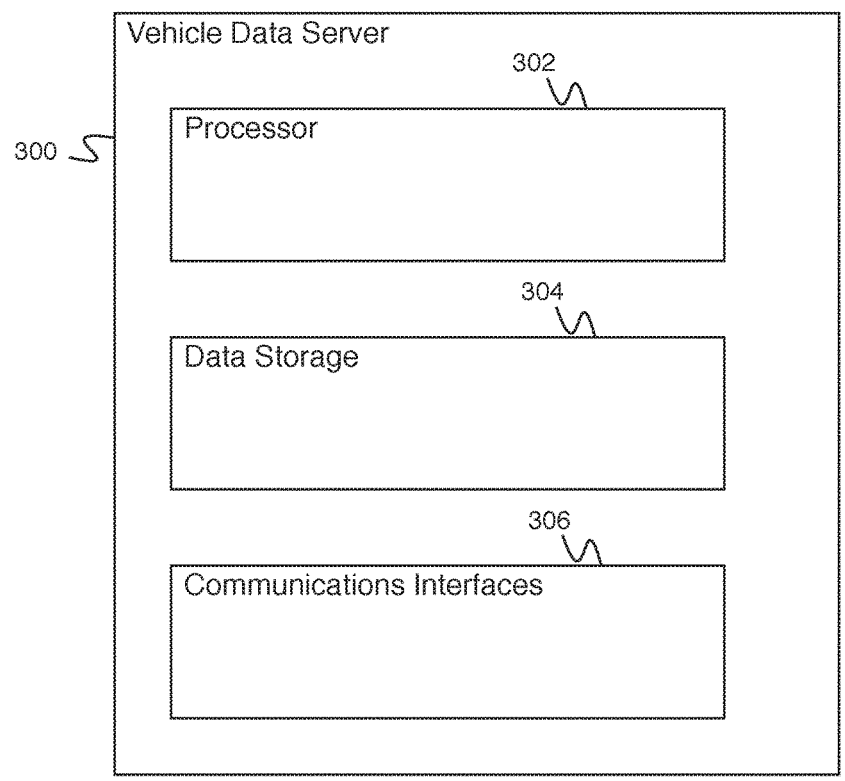
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 comprises processor 302. In various embodiments, processor 302 comprises a processor for determining a route, determining a set of route segments, determining a route segment safety score, collecting speed data, determining a speed distribution, or for any other appropriate purpose. Data storage 304 comprises a data storage (e.g., a random access memory (RAM), a read only memory (ROM), a nonvolatile memory, a flash memory, a hard disk, or any other appropriate data storage). In various embodiments, data storage 304 comprises a data storage for storing instructions for processor 302, vehicle event recorder data, vehicle event data, sensor data, video data, map data, machine learning algorithm data, or any other appropriate data. In various embodiments, communications interfaces 306 comprises one or more of a GSM interface, a CDMA interface, a WiFi interface, an Ethernet interface, a USB interface, a Bluetooth interface, an Internet interface, a fiber optic interface, or any other appropriate interface. In various embodiments, vehicle data server 300 receives events, maneuvers, data, or any other appropriate information from one or more vehicle event recorders.

Figure 4:
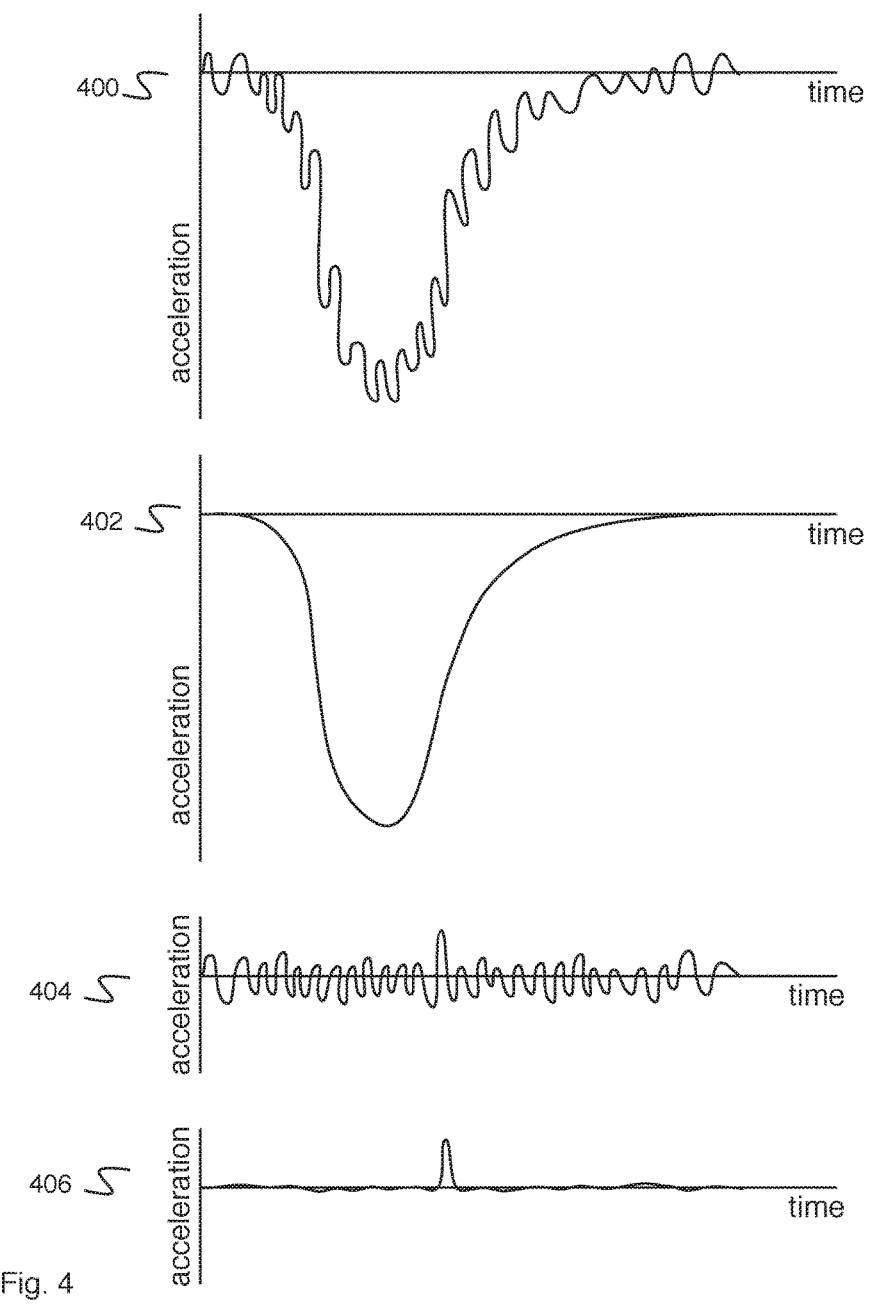
FIG. 4 is a diagram illustrating an embodiment of a set of acceleration curves.

FIG. 4 is a diagram illustrating an embodiment of a set of acceleration curves. In some embodiments, the acceleration curves of FIG. 4 comprise data measured by sensors mounted on a vehicle (e.g., vehicle 106 of FIG. 1) or derived from data measured by sensors mounted on a vehicle. In the example shown, accelerometer data 400 comprises data measured by an accelerometer mounted on a vehicle as the vehicle is performing a maneuver on a rough road. Accelerometer data 400 begins near zero and drops to a negative value, indicating the vehicle is slowing down, before gradually returning to zero. Accelerometer data 400 additionally comprises a significant amount of noise as a result of the rough road. Coarse acceleration data 402 comprises acceleration data derived from coarse behavior data describing the coarse behavior of the vehicle. In various embodiments, coarse behavior data comprises global positioning system (e.g., GPS) data, speedometer data, or any other global speed or position data. In various embodiments, determining coarse acceleration data 402 from coarse behavior data comprises one or more of: taking the first derivative of the coarse behavior data, taking the second derivative of the coarse behavior data, filtering the coarse behavior data, changing the sample rate of the coarse behavior data, scaling the coarse behavior data, or processing the coarse behavior data in any other appropriate way. Perturbation acceleration 404 comprises a perturbation acceleration, e.g., a small signal acceleration perturbation that is felt by the vehicle as a deviation to a coarse acceleration. Perturbation acceleration 404 is determined by subtracting coarse acceleration data 402 from accelerometer data 400. Perturbation acceleration 404 is analyzed for signals indicating anomalous events. In some embodiments, an anomalous event is detected from perturbation acceleration 404 in the event that the magnitude of perturbation acceleration 404 is greater than a threshold. Denoised acceleration 406 comprises a denoised acceleration, e.g., acceleration data with a noise component removed. Denoised acceleration 406 comprises perturbation acceleration 404 with the noise component removed. In some embodiments, noise is removed from perturbation acceleration 404 by filtering. In some embodiments, a noisy perturbation component of perturbation acceleration 404 is determined (e.g., using machine learning, by determining parameters of a noise model, etc.) and removed (e.g., by subtraction, using a machine learning noise removal algorithm, etc.). Denoised acceleration 406 is analyzed for signals indicating anomalous events. In various embodiments, an anomalous event is detected from denoised acceleration 406 in the event that the magnitude of denoised acceleration 406 is greater than a threshold, in the event that the magnitude of the first derivative of denoised acceleration 406 is greater than a threshold, in the event that denoised acceleration comprises a high frequency component (e.g., determined by computing a Fourier transform) with a magnitude greater than a threshold, in the event that a machine learning algorithm determines an anomalous event, or an anomalous event is detected in any other appropriate way.

Forward Decomposition

In some embodiments, forward acceleration is the forward component of the acceleration measured by an accelerometer sensor installed in the vehicle. This acceleration can be decomposed as:

$$forward\_acceleration = forward\_coarse\_acceleration + perturbation$$

where the forward coarse acceleration describes the forward macroscopic movement of the vehicle or trajectory, and the perturbation describes additional vehicle movement at each position. The forward_coarse_acceleration can be estimated directly from the accelerometer sensor's measurements as the derivative of the vehicle speed and is a smoother signal that takes negative values in the event that the vehicle is braking and positive ones in the event that the vehicle is accelerating:

$$forward\_coarse\_acceleration = d(speed)/dt = d^2(position)/dt^2$$

Knowing the forward_acceleration and the forward_coarse_acceleration from the accelerometer sensor's data, the perturbation is obtained by subtraction:

$$perturbation = forward\_acceleration - forward\_coarse\_acceleration$$

In some embodiments, for forward_acceleration since the accelerometer is not mounted aligned with the vehicle, a rotation of the accelerometer signal is needed to obtain the actual forward acceleration. In some embodiments, a scaling is done to convert the signal to appropriate units (e.g., cg units). In some embodiments, the forward acceleration is provided at a frequency of 100 Hz by a sensor. In some embodiments, a vehicle speed is obtained from a vehicle event recorder at 10 Hz, and a moving average filter is applied to the vehicle speed data for smoothing using a 0.5 second rolling window. The forward macroscopic acceleration, which is the derivative of the vehicle speed data, is calculated at each point as the difference between the speed the 0.5 second after and the 0.5 second before divided by 1 second.

Lateral Decomposition

In some embodiments, lateral acceleration is the lateral component of the acceleration measured by an accelerometer sensor installed in the vehicle. This acceleration can be decomposed as:

$$lateral\_acceleration = lateral\_coarse\_acceleration + perturbation$$

where the lateral coarse acceleration describes the lateral macroscopic movement of the vehicle or trajectory, and the perturbation describes additional vehicle movement at each position. The lateral_coarse_acceleration can be estimated directly from the angular velocity and the vehicle speed and is a smoother signal that takes negative values in the event that the vehicle is turning left and positive ones in the event that the vehicle turning right:

$$lateral\_coarse\_acceleration = angular\_velocity * speed$$

In some embodiments, from regular heading readings obtained from a global position system (GPS), an estimate of angular_velocity is determined as:

$$angular\_velocity = d(heading)/dt = heading\_change/delta\_time$$

In some embodiments, from yaw rate readings obtained from a gyroscope, the angular velocity is determined as:

$$angular\_velocity = yaw\_rate$$

For example, a vehicle that takes 5 seconds to make a 90 degree right turn at a constant speed of 20 kph would have:

$$angular\_velocity = 90\ degrees/5\ sec = 0.314159\ radians/sec$$

and $$lateral\_coarse\_acceleration = (0.314159\ radians/sec) * (20\ Kph) = 1.7453\ m/s^2 = 17.809\ cg$$

Knowing the lateral_acceleration and the lateral_coarse_acceleration from the accelerometer sensor's data, the perturbation is obtained by subtraction:

$$perturbation = lateral\_acceleration - lateral\_coarse\_acceleration$$

In some embodiments, for lateral acceleration, a scaling of the raw data is done to convert the signal to cg units. In some embodiments, the lateral acceleration is provided at a frequency of 100 Hz by a sensor. In some embodiments, the vehicle speed is obtained from the vehicle event recorder at 10 Hz, and a moving average filter is applied to the vehicle speed data for smoothing using a 0.5 second rolling window. In some embodiments, the angular_velocity is calculated from changes in a GPS heading. In some embodiments, the GPS readings are available at 2 Hz, so at each GPS timestamp the angular_velocity is calculated as the difference in heading between the next GPS reading and the previous GPS reading divided by 1 sec, followed by a conversion from degrees to radians. In some embodiments, the GPS heading readings are delayed so the timestamps of the derived angular velocity need to be aligned (e.g., by subtracting 1 second or any other appropriate amount). For each lateral acceleration the nearest (in time) available vehicle event recorder speed and angular_velocity are associated with each other and used for determination of the perturbation. In some embodiments, the angular_velocity is further smoothed with a 0.5 second average filter.

In some embodiments, for the forward and lateral decompositions, note that signal smoothing has only been performed when necessary—for example, the forward and lateral acceleration are not smoothed, because smoothing upfront might erase some valuable signal signatures. In various embodiments, additional factors are calculated that can describe specific properties relevant to this problem by applying to the coarse acceleration and the perturbation some processing like integration, Fourier transform, derivative, etc. or any other appropriate processing. In some embodiments, perturbations are smoothed and used as a time series input to a model together with the coarse acceleration series.

In some embodiments, when using accelerometer data to detect risky driving, the main scenarios to capture are: hard braking, hard cornering and collisions. In some embodiments, collision comprises an impact with another object—for example, another vehicle, an animal, a post, etc.

In some embodiments, the events and classifications provided as examples herein are generated with a model that uses as input the accelerometer signals without decomposition. The model applies a threshold to such signals and only examine instances where the forward or lateral acceleration are above a threshold. This is a simplified approach that is prone to miss low G-force collisions and also prone to misclassifying rough road as risky hard braking, cornering, or collision.

In some embodiments, the preprocessing of the accelerometer data to decompose it into a coarse component and a perturbation allows the capture and the classification of risk more efficiently. On the one hand, the macroscopic component by itself can easily identify hard braking and hard cornering by direct application of a threshold to these signals. That macroscopic acceleration also provides the context of what the trajectory of the vehicle is like when a certain perturbation is felt.

In some embodiments, the identification of collisions is aided by the signature of the perturbation, and a much lower threshold is applied to the perturbation allowing detection of lower G-force impacts. Any perturbation signal with magnitude higher than the standard sensor noise level is relevant. For example, instead of using typical acceleration thresholds of 35 cg for forward acceleration and 40 cg for lateral acceleration in tractor trailers to capture an anomalous event, one could use those thresholds on the macroscopic acceleration to detect hard braking and cornering and then apply lower thresholds to the perturbation (e.g., a threshold of 20 cg for forward perturbations and a threshold of 25 cg for lateral perturbations) to identify collisions in the event that the sensor noise amplitude is typically under a limit (e.g., 10 cg).

In some embodiments, decomposing the acceleration into coarse and perturbation components before using it as input to a machine learning model aids the model in identifying risky patterns. In some embodiments, these signals are input as time series, or features are derived from them before input. For example, the perturbation has different characteristics for a rough road or for an impact, so features that specifically capture that will help differentiating both. A rough road perturbation oscillates around 0 and if it has a higher peak in magnitude, it is in general centered on the perturbation. The frequency of a perturbation due to rough road could also indicate vibration (if higher) or a vehicle rocking back and forth (if lower). On the other hand, an impact is characterized by a sudden component or peak that is negative or positive followed possibly by minor peaks. In the case of the forward decomposition, a negative component in the perturbation indicates a forward collision and a positive component a rear-end collision. In the case of the lateral decomposition, a negative perturbation component indicates a collision that was felt by the sensor as a force from the right, which then tilts the vehicle to the left, and a positive perturbation component would be an impact force from the left. In the case of a collision, the duration of the perturbation can possibly be correlated to the duration of the impact, a side swipe lasts longer than a head on impact.

In some embodiments, when a restricted set of training data is available and only a simple machine learning algorithm is built from it to predict risk (e.g., a logistic model or a single layer neural network model), prior decomposition of the acceleration and smart features built on both the perturbation and the coarse acceleration would allow such simple models to perform better at risk detection compared to the same model architectures applied to an overall acceleration without doing decomposition.

In some embodiments, acceleration decomposition allows the earlier adoption of a more complex model (e.g., random forest, gradient boosting or multilayer deep learning) to increase performance using a medium size training data set, as the model is not expected to figure out all the accelerometer intricacies by itself. If no acceleration decomposition is performed, these complex models require a very large dataset for training to deliver similar performance.

Figure 5:
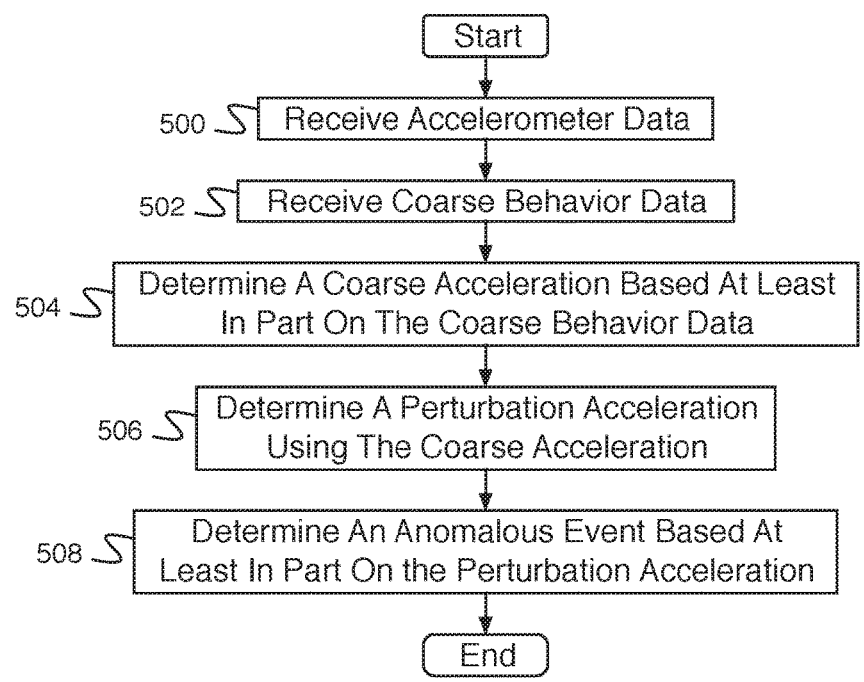
FIG. 5 is a flow diagram illustrating an embodiment of a process for decoupling accelerometer signals.

FIG. 5 is a flow diagram illustrating an embodiment of a process for decoupling accelerometer signals. In some embodiments, the process of FIG. 5 is executed by a vehicle event recorder (e.g., vehicle event recorder 102 of FIG. 1). In the example shown, in 500, accelerometer data is received. In various embodiments, received accelerometer data comprises forward motion data, lateral motion data, composite motion data, or any other appropriate data. In 502, coarse behavior data is received. In various embodiments, received coarse behavior data comprises forward motion data, lateral motion data, composite motion data, or any other appropriate data. In some embodiments, coarse behavior data comprises position data received from a global positioning system. In some embodiments, coarse behavior data comprises speed data from a speedometer. In 504, a coarse acceleration is determined based at least in part on the coarse behavior data. In various embodiments, determining a coarse acceleration from coarse behavior data comprises one or more of: taking the first derivative of the coarse behavior data, taking the second derivative of the coarse behavior data, filtering the coarse behavior data, changing the sample rate of the coarse behavior data, scaling the coarse behavior data, or processing the coarse behavior data in any other appropriate way. In 506, a perturbation acceleration is determined using the coarse acceleration. In some embodiments, a perturbation acceleration is determined by subtracting the coarse behavior data from the accelerometer data. In 508, an anomalous event is determined based at least in part on the perturbation acceleration. In some embodiments, the process of FIG. 5 is carried out independently for forward motion data and for lateral motion data (e.g., the accelerometer data and the coarse behavior data comprise forward motion data, the accelerometer data and the coarse behavior data comprise lateral motion data, etc.).

Figure 6:
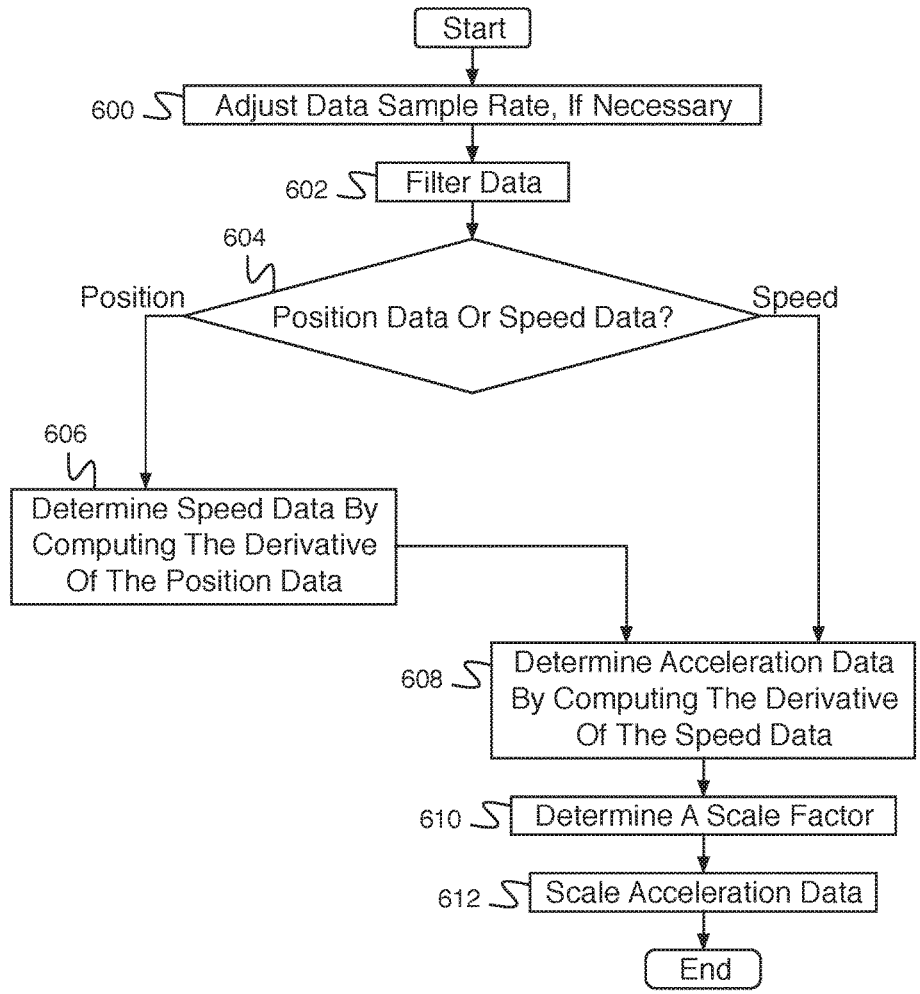
FIG. 6 is a flow diagram illustrating an embodiment of a process for determining a coarse acceleration based at least in part on coarse behavior data.

FIG. 6 is a flow diagram illustrating an embodiment of a process for determining a coarse acceleration based at least in part on coarse behavior data. In some embodiments, the process of FIG. 6 implements 504 of FIG. 5. In the example shown, in 600, the sample rate is adjusted, if necessary. In some embodiments, the sample rate of the coarse behavior data is adjusted in order for it to match the sample rate of accelerometer data (e.g., accelerometer data received in 500 of FIG. 5). The sample rate is adjusted using sample reduction, sample interpolation, or any other appropriate technique. In 602, the data is filtered (e.g., to reduce noise). In 604, it is determined whether the data comprises position data or speed data. In some embodiments, coarse behavior data comprises position data received from a global positioning system or speed data received from a speedometer. In the event it is determined that the data comprises speed data, control passes to 608. In the event it is determined that the data comprises position data, control passes to 606. In 606, speed data is determined by computing the derivative of the position data. Control then passes to 608. In 608, acceleration data is determined by computing the derivative of the speed data. In 610, a scale factor is determined. In some embodiments, a scale factor comprises the ratio of the scale of the acceleration data determined in 608 to the scale of the accelerometer data. In various embodiments, scaling is linear, non-linear, in amplitude, in time, includes a scaling factor, or in any other appropriate dimension or scaling methodology. In various embodiments, the scale factor is determined by comparing the acceleration data determined in 608 and the accelerometer data, comparing filtered versions of the acceleration data determined in 608 and the accelerometer data, dividing the acceleration data determined in 608 by the accelerometer data and integrating the result, or in any other appropriate way. In 612, the acceleration data is scaled (e.g., by the scale factor).

Figure 7:
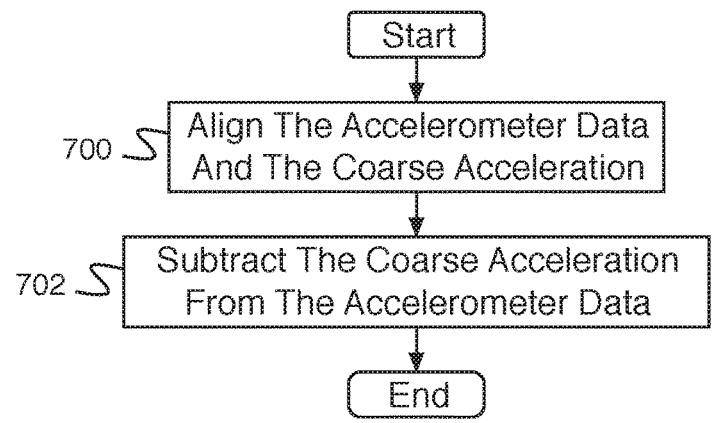
FIG. 7 is a flow diagram illustrating an embodiment of a process for determining a perturbation acceleration using a coarse acceleration.

FIG. 7 is a flow diagram illustrating an embodiment of a process for determining a perturbation acceleration using a coarse acceleration. In some embodiments, the process of FIG. 7 implements 506 of FIG. 5. In the example shown, in 700, the accelerometer data and the coarse acceleration are aligned (e.g., in the time axis, for example such that a reference time point within the accelerometer data and within the coarse acceleration data are aligned). In 702, the coarse acceleration is subtracted from the accelerometer data.

Figure 8:
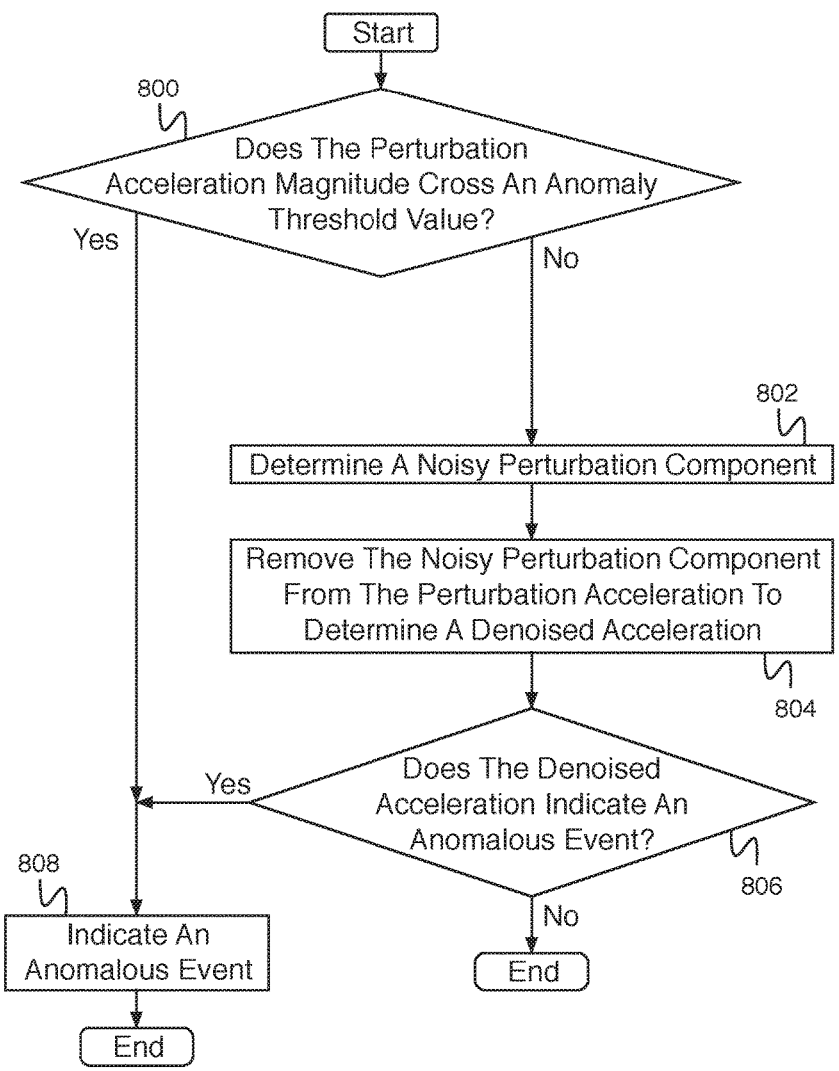
FIG. 8 is a flow diagram illustrating an embodiment of a process for determining an anomalous event based at least in part on a perturbation acceleration.

FIG. 8 is a flow diagram illustrating an embodiment of a process for determining an anomalous event based at least in part on a perturbation acceleration. In some embodiments, the flow diagram of FIG. 8 implements 508 of FIG. 5. In the example shown, in 800, it is determined whether the perturbation acceleration magnitude crosses an anomaly threshold value. In the event it is determined that the perturbation acceleration magnitude crosses the anomaly threshold value, control passes to 808. In the event it is determined that the perturbation acceleration magnitude does not cross the anomaly threshold value, control passes to 802. In 802, a noisy perturbation component is determined. In various embodiments, a noisy perturbation component is determined by filtering the perturbation acceleration magnitude, by determining parameters of a noisy perturbation component model, by analyzing the perturbation acceleration using a machine learning technique, by using a neural network, or using any other appropriate technique. In 804, the noisy perturbation component is removed from the perturbation acceleration to determine a denoised acceleration. In some embodiments, the noisy perturbation component is removed using subtraction. In some embodiments, the noisy perturbation component is removed using a noisy perturbation component removal algorithm. In 806, it is determined whether the denoised acceleration indicates an anomalous event. In various embodiments, determining whether the denoised acceleration indicates an anomalous event comprises determining whether the denoised acceleration magnitude crosses a threshold, determining whether the magnitude of the first derivative of the denoised acceleration crosses a threshold, determining whether the denoised acceleration comprises a high frequency component with a magnitude that crosses a threshold, or determining whether the denoised acceleration indicates an anomalous event in any other appropriate way. In the event it is determined that the denoised acceleration indicates an anomalous event, control passes to 808. In the event it is determined that the denoised acceleration does not indicate an anomalous event, the process ends. In 808, an anomalous event is indicated.

Figure 9:
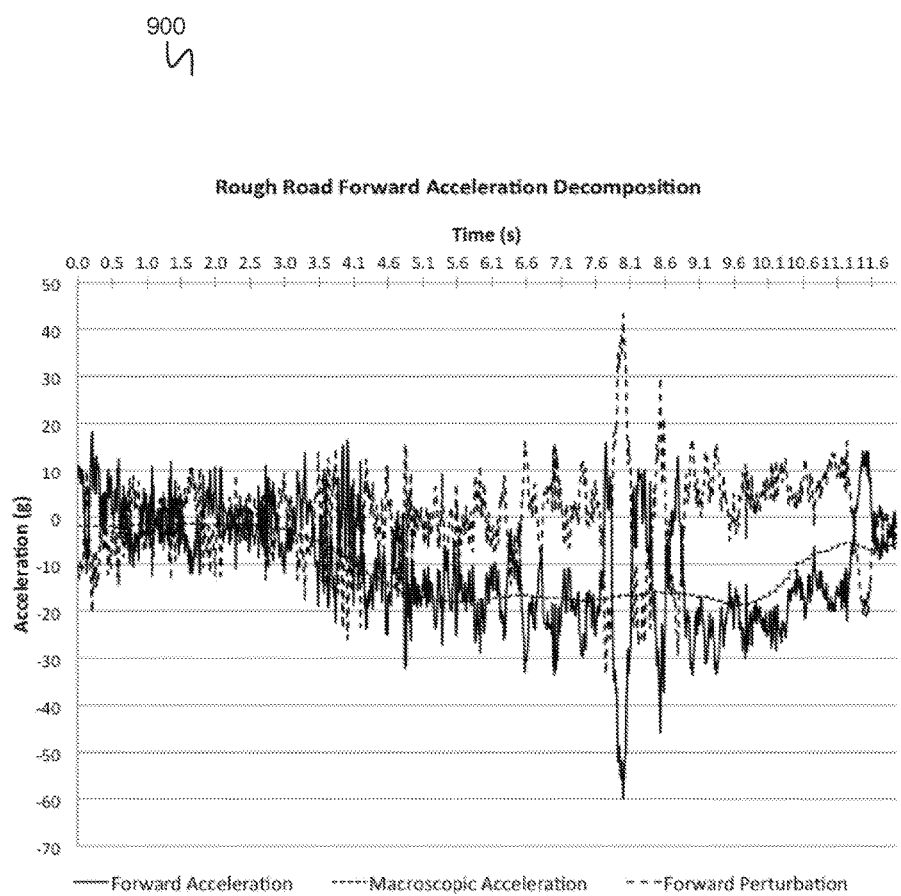
FIG. 9 is a diagram illustrating an embodiment of an acceleration plot.

FIG. 9 is a diagram illustrating an embodiment of an acceleration plot. In some embodiments, acceleration plot 900 comprises a forward acceleration decomposition plot measured by a vehicle event recorder (e.g., vehicle event recorder 200 of FIG. 2). In the example shown, acceleration plot 900 shows a plot of an acceleration decomposition during a rough road event misclassified as a collision by a model that does not use decomposition. Forward acceleration comprises a measured forward acceleration. Macroscopic acceleration comprises a coarse acceleration derived from coarse behavior data. Forward perturbation comprises an acceleration plot derived from forward acceleration and macroscopic acceleration. In the example shown, forward perturbation shows an oscillation around 0 lasting for around 2 seconds, typical of a rough road. The amplitude of the oscillation is moderate because the vehicle speed is low, around 15 miles per hour at the time.

Figure 10:
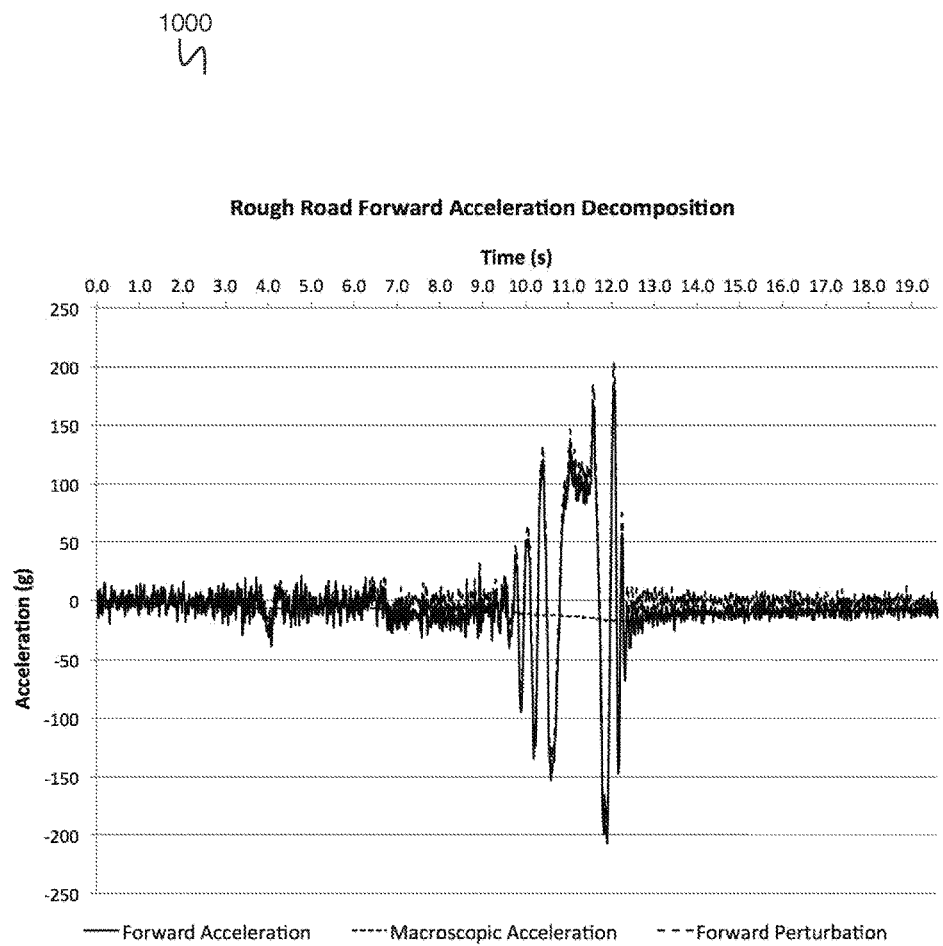
FIG. 10 is a diagram illustrating an embodiment of an acceleration plot.

FIG. 10 is a diagram illustrating an embodiment of an acceleration plot. In some embodiments, acceleration plot 1000 comprises a forward acceleration decomposition plot measured by a vehicle event recorder (e.g., vehicle event recorder 200 of FIG. 2). In the example shown, acceleration plot 1000 shows a plot of an acceleration decomposition during a rough road event misclassified as a collision by a model that does not use decomposition. Forward acceleration comprises a measured forward acceleration. Macroscopic acceleration comprises a coarse acceleration derived from coarse behavior data. Forward perturbation comprises an acceleration plot derived from forward acceleration and macroscopic acceleration. In the example shown, forward perturbation shows an oscillation around 0 lasting for around 2.5 seconds, typical of rough road. The amplitude of the oscillation is high and was possibly magnified due to the suspension of the vehicle.

Figure 11:
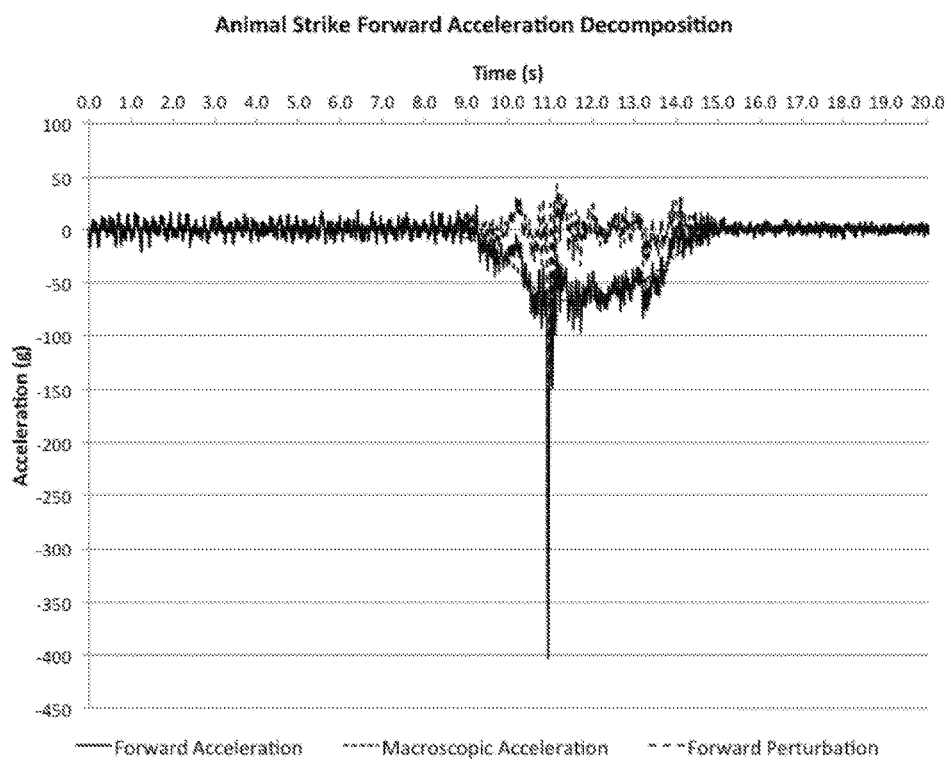
FIG. 11 is a diagram illustrating an embodiment of an acceleration plot.

FIG. 11 is a diagram illustrating an embodiment of an acceleration plot. In some embodiments, acceleration plot 1100 comprises a forward acceleration decomposition plot measured by a vehicle event recorder (e.g., vehicle event recorder 200 of FIG. 2). In the example shown, acceleration plot 1100 shows a plot of an acceleration decomposition during an animal strike event properly classified as a collision. Forward acceleration comprises a measured forward acceleration. Macroscopic acceleration comprises a coarse acceleration derived from coarse behavior data. Forward perturbation comprises an acceleration plot derived from forward acceleration and macroscopic acceleration. In the example shown, forward perturbation shows a negative peak typical of frontal impact. The negative peak is high in amplitude and very narrow, indicating the contact with the animal was at high speed, head on and very short.

Figure 12:
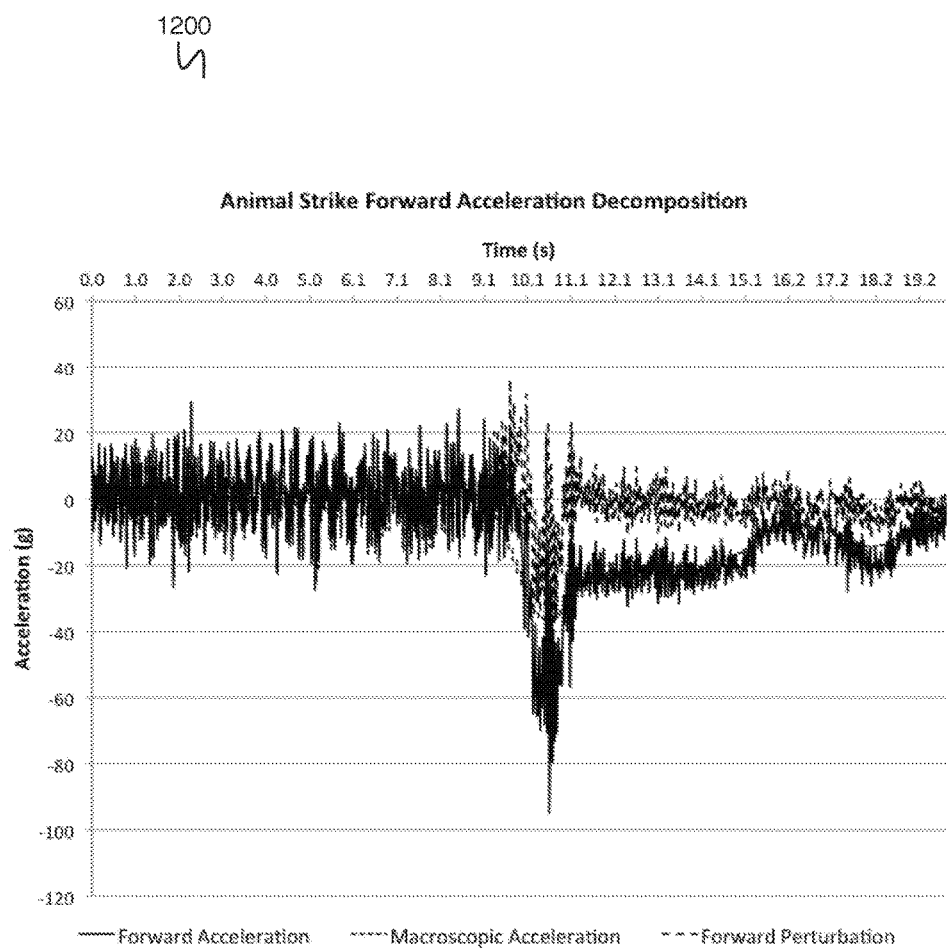
FIG. 12 is a diagram illustrating an embodiment of an acceleration plot.

FIG. 12 is a diagram illustrating an embodiment of an acceleration plot. In some embodiments, acceleration plot 1200 comprises a forward acceleration decomposition plot measured by a vehicle event recorder (e.g., vehicle event recorder 200 of FIG. 2). In the example shown, acceleration plot 1200 shows a plot of an acceleration decomposition during an animal strike event misclassified as braking by a model that does not use decomposition. Forward acceleration comprises a measured forward acceleration. Macroscopic acceleration comprises a coarse acceleration derived from coarse behavior data. Forward perturbation comprises an acceleration plot derived from forward acceleration and macroscopic acceleration. In the example shown, forward perturbation shows a negative peak typical of frontal impact. The peak is not sharp and high as in plot 1100 of FIG. 11 because this time the impact was not head on but rather on the left part of the bumper.

Figure 13:
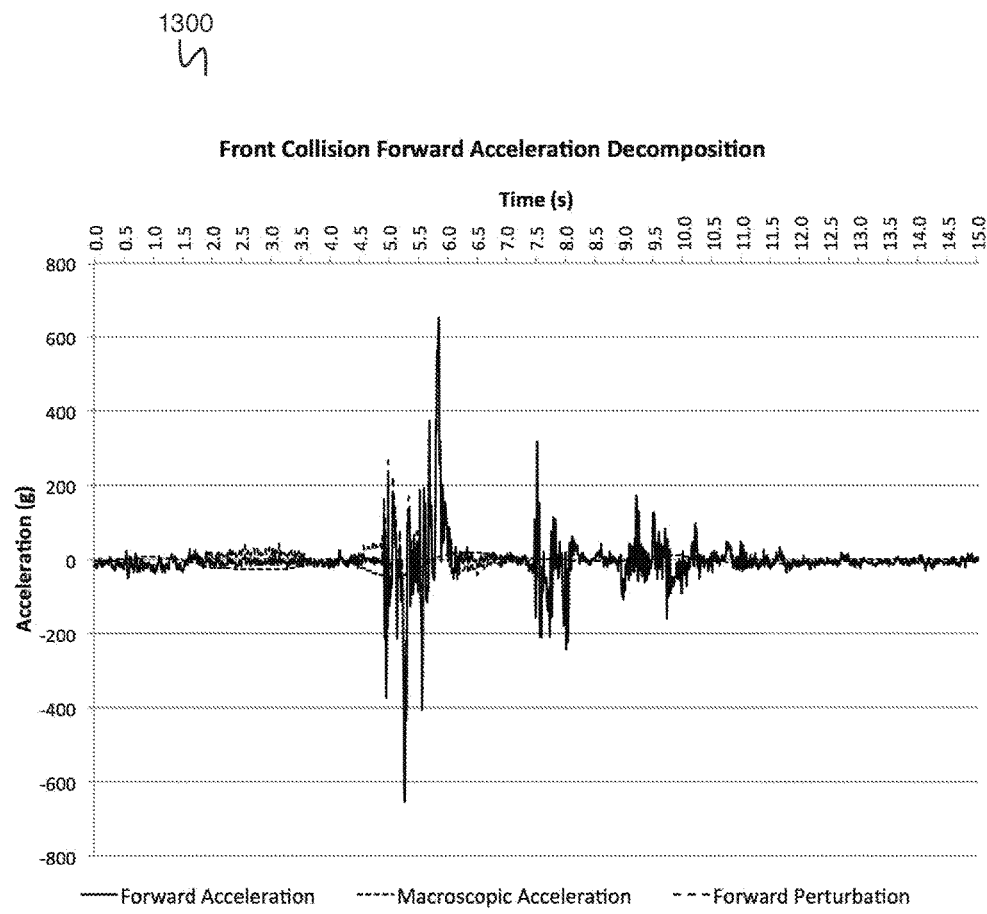
FIG. 13 is a diagram illustrating an embodiment of an acceleration plot.

FIG. 13 is a diagram illustrating an embodiment of an acceleration plot. In some embodiments, acceleration plot 1300 comprises a forward acceleration decomposition plot measured by a vehicle event recorder (e.g., vehicle event recorder 200 of FIG. 2). In the example shown, acceleration plot 1300 shows a plot of an acceleration decomposition during a frontal collision with a freeway divider as the vehicle spins in an event properly classified as a collision. Forward acceleration comprises a measured forward acceleration. Macroscopic acceleration comprises a coarse acceleration derived from coarse behavior data. Forward perturbation comprises an acceleration plot derived from forward acceleration and macroscopic acceleration. In the example shown, forward perturbation shows a high negative signal followed by a positive one, typical of impact with a frontal component that hits a heavy object.

Figure 14:
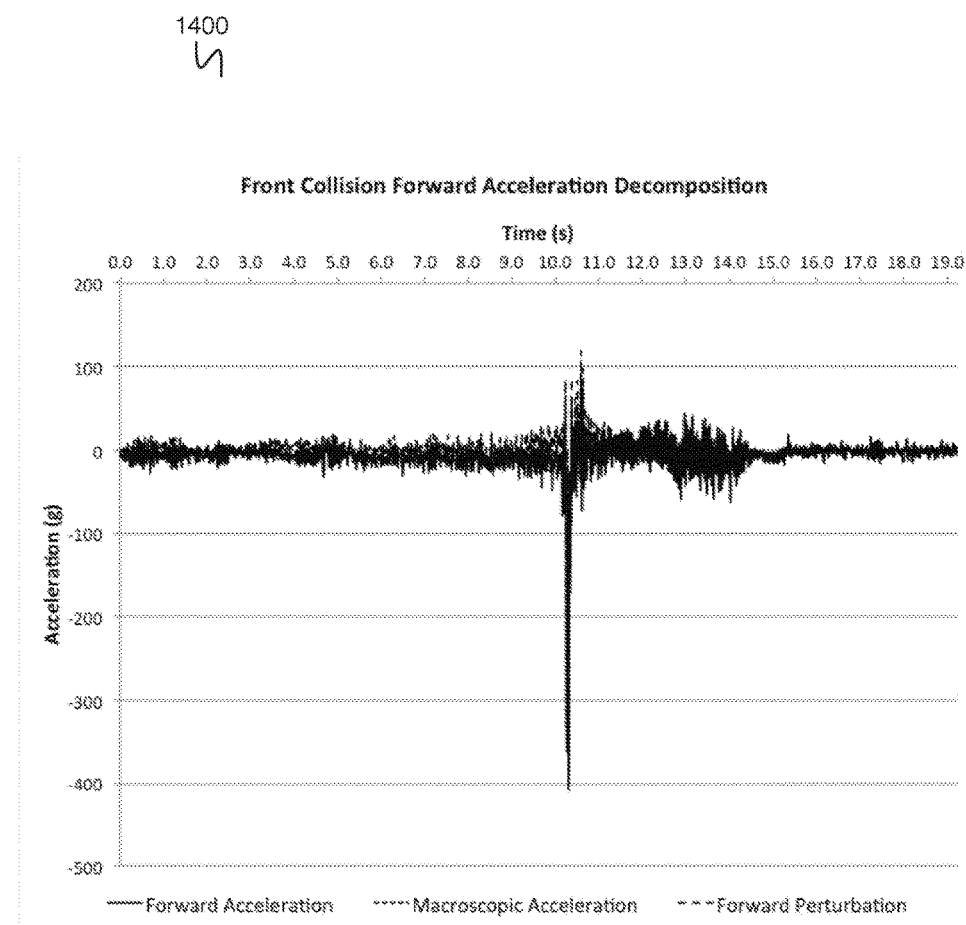
FIG. 14 is a diagram illustrating an embodiment of an acceleration plot.

FIG. 14 is a diagram illustrating an embodiment of an acceleration plot. In some embodiments, acceleration plot 1400 comprises a forward acceleration decomposition plot measured by a vehicle event recorder (e.g., vehicle event recorder 200 of FIG. 2). In the example shown, acceleration plot 1400 shows a plot of an acceleration decomposition during a frontal collision with a stopped truck in an event properly classified as a collision. Forward acceleration comprises a measured forward acceleration. Macroscopic acceleration comprises a coarse acceleration derived from coarse behavior data. Forward perturbation comprises an acceleration plot derived from forward acceleration and macroscopic acceleration. In the example shown, forward perturbation shows a high negative signal followed by a positive one, typical of impact with a frontal component that hits a heavy object.

Figure 15:
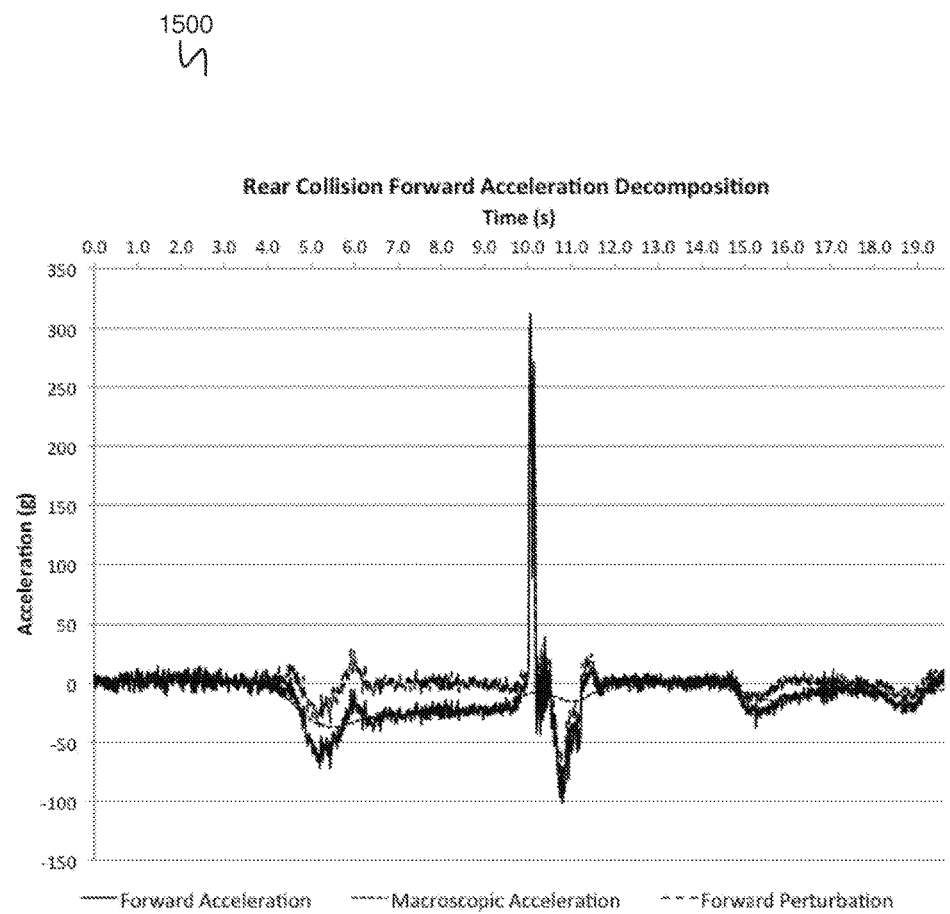
FIG. 15 is a diagram illustrating an embodiment of an acceleration plot.

FIG. 15 is a diagram illustrating an embodiment of an acceleration plot. In some embodiments, acceleration plot 1500 comprises a forward acceleration decomposition plot measured by a vehicle event recorder (e.g., vehicle event recorder 200 of FIG. 2). In the example shown, acceleration plot 1500 shows a plot of an acceleration decomposition during a rear collision event properly classified as a collision. Forward acceleration comprises a measured forward acceleration. Macroscopic acceleration comprises a coarse acceleration derived from coarse behavior data. Forward perturbation comprises an acceleration plot derived from forward acceleration and macroscopic acceleration. In the example shown, forward perturbation shows a high positive signal followed by a negative one, typical of being rear-ended by another vehicle.

Figure 16:
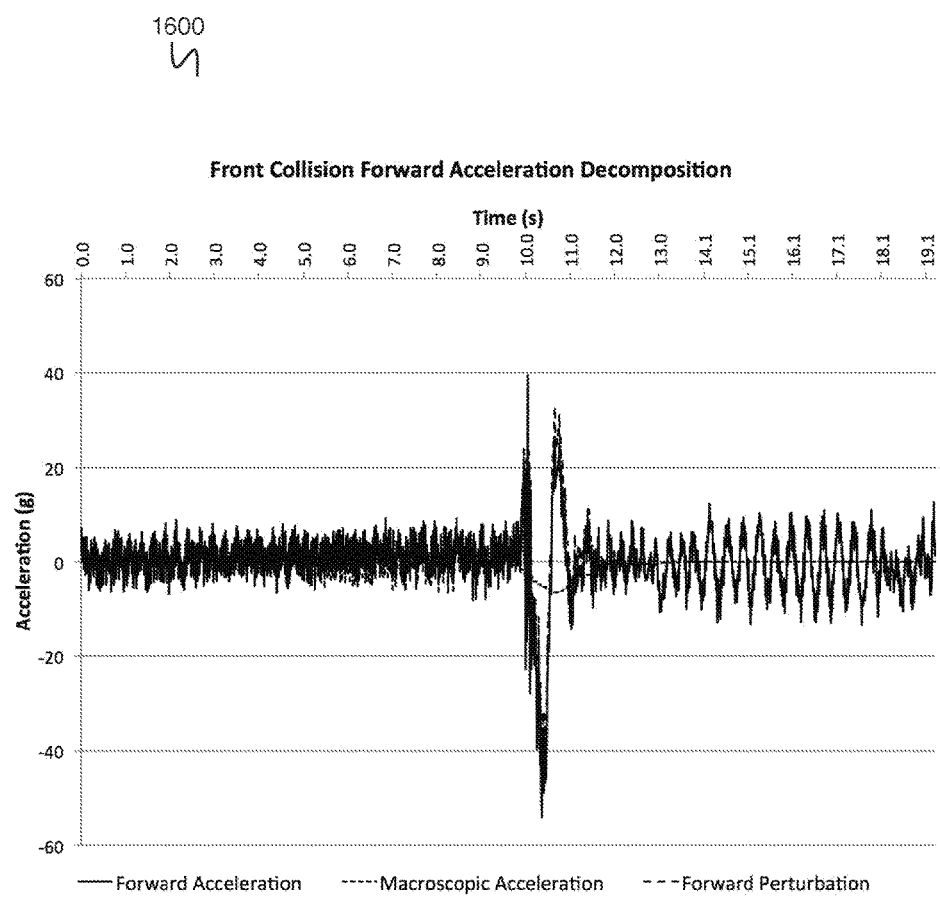
FIG. 16 is a diagram illustrating an embodiment of an acceleration plot.

FIG. 16 is a diagram illustrating an embodiment of an acceleration plot. In some embodiments, acceleration plot 1600 comprises a forward acceleration decomposition plot measured by a vehicle event recorder (e.g., vehicle event recorder 200 of FIG. 2). In the example shown, acceleration plot 1600 shows a plot of an acceleration decomposition during an event where the vehicle was stopped in traffic and slowly drifted forward hitting a forward stopped vehicle. The event was misclassified as braking by a model that does not use decomposition. Forward acceleration comprises a measured forward acceleration. Macroscopic acceleration comprises a coarse acceleration derived from coarse behavior data. Forward perturbation comprises an acceleration plot derived from forward acceleration and macroscopic acceleration. In the example shown, forward perturbation shows a signal after the macroscopic acceleration has been subtracted indicating that the event was not just a braking. The forward perturbation includes a moderate negative peak indicative of a possible moderate frontal collision.

In some embodiments, a model built using the overall forward acceleration as input can often misclassify rough road incidents as collisions and collisions as brakings. However, once the macroscopic acceleration is subtracted, we see that if the forward perturbation is used as model input it can lead to more accurate predictions as it has specific signatures that can be used to tell apart those scenarios. For example, a rough road is characterized by an oscillatory perturbation around 0 and amplitude higher than the standard noise; a frontal impact is characterized by a negative peak, and is followed by a positive one when the object being impacted is heavy and/or impact is at high speed; and a rear end collision is characterized by a positive peak followed by a negative minor one.

Figure 17:
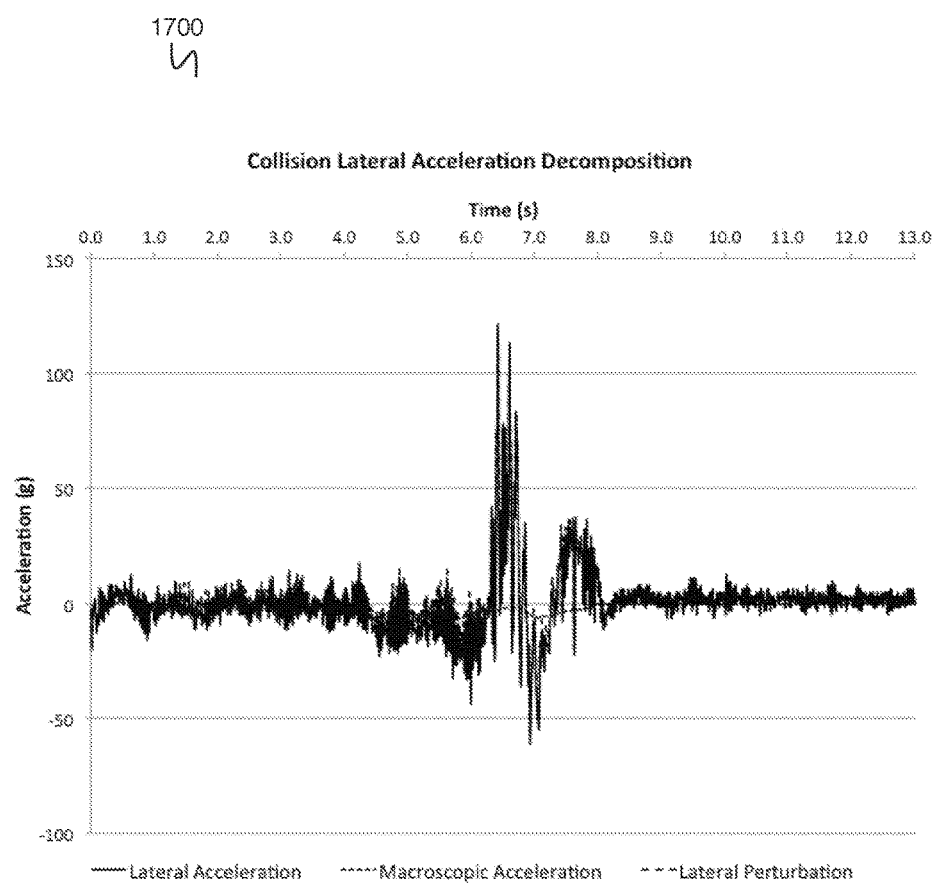
FIG. 17 is a diagram illustrating an embodiment of an acceleration plot.

FIG. 17 is a diagram illustrating an embodiment of an acceleration plot. In some embodiments, acceleration plot 1700 comprises a lateral acceleration decomposition plot measured by a vehicle event recorder (e.g., vehicle event recorder 200 of FIG. 2). In the example shown, acceleration plot 1700 shows a plot of an acceleration decomposition during a collision, during which the vehicle starts turning left at a corner and hits a vehicle that was coming in same direction on the lane to the left. Lateral acceleration comprises a measured lateral acceleration. Macroscopic acceleration comprises a coarse lateral acceleration derived from coarse behavior data. Lateral perturbation comprises an acceleration plot derived from lateral acceleration and macroscopic acceleration. In the example shown, the macroscopic lateral acceleration shows a negative component which indicates a turn left. The lateral perturbation shows a main positive component first indicating a tilt towards the right as the vehicle is impacted from the left. It was a lateral impact on both vehicles that lasted around 0.5 sec (from 6.25 to 6.75 sec). There is a minor negative component and a positive one afterwards due to the vehicle bouncing after the impact.

Figure 18:
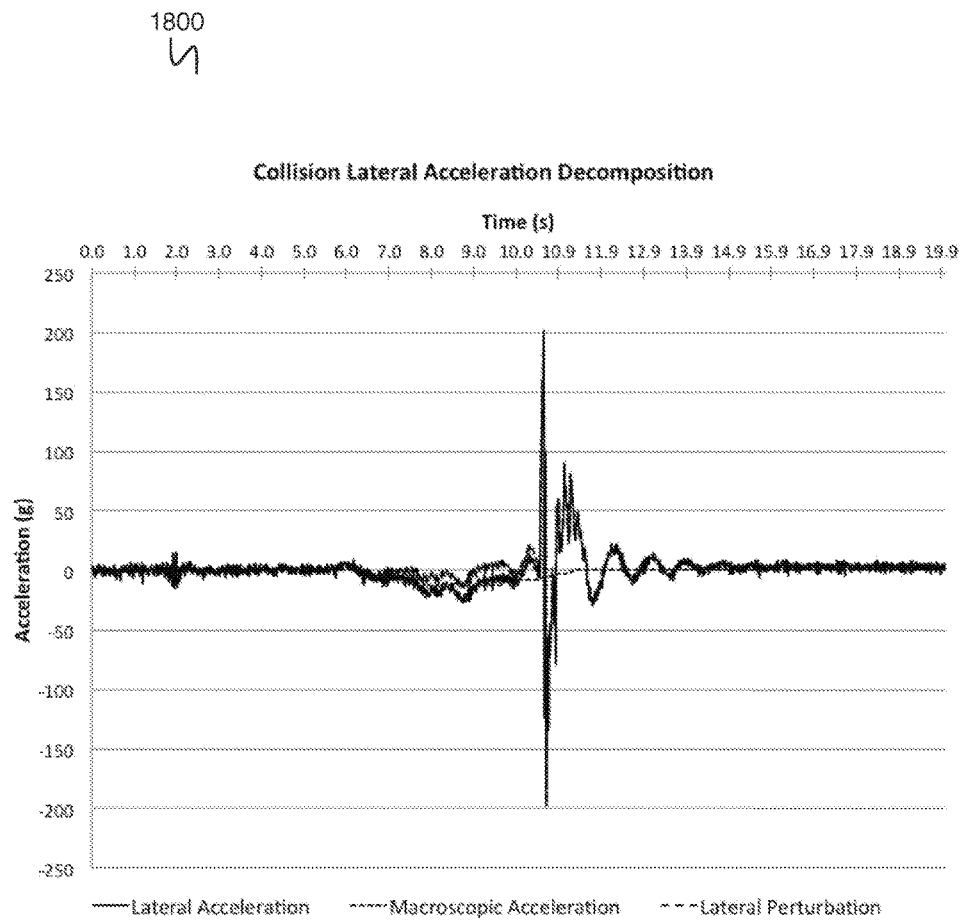
FIG. 18 is a diagram illustrating an embodiment of an acceleration plot.

FIG. 18 is a diagram illustrating an embodiment of an acceleration plot. In some embodiments, acceleration plot 1800 comprises a lateral acceleration decomposition plot measured by a vehicle event recorder (e.g., vehicle event recorder 200 of FIG. 2). In the example shown, acceleration plot 1800 shows a plot of an acceleration decomposition during a collision, during which the vehicle starts turning left at a corner and a vehicle coming from the opposite direction hits it from the right. Lateral acceleration comprises a measured lateral acceleration. Macroscopic acceleration comprises a coarse lateral acceleration derived from coarse behavior data. Lateral perturbation comprises an acceleration plot derived from lateral acceleration and macroscopic acceleration. In the example shown, the impact is on the back part of the vehicle beyond center of gravity so that at the front where the sensor is installed it is felt as a force from the left. The incoming vehicle hits head on. The macroscopic lateral acceleration shows a negative component, which indicates a turn to the left. The perturbation shows a sharp positive component first due to the impact being felt as force from the left at the sensor location. Its short duration around 0.1 second likely correlates with the short time both vehicles were in contact.

Figure 19:
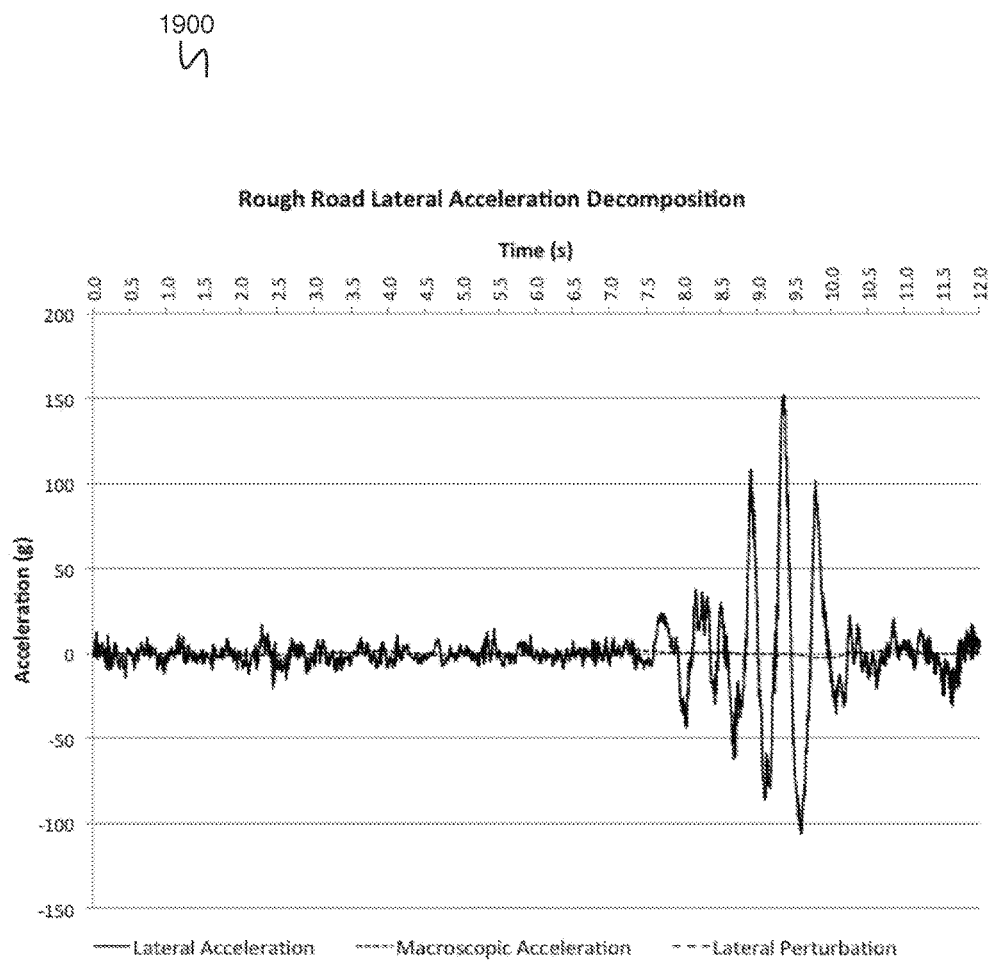
FIG. 19 is a diagram illustrating an embodiment of an acceleration plot.

FIG. 19 is a diagram illustrating an embodiment of an acceleration plot. In some embodiments, acceleration plot 1900 comprises a lateral acceleration decomposition plot measured by a vehicle event recorder (e.g., vehicle event recorder 200 of FIG. 2). In the example shown, acceleration plot 1900 shows a plot of an acceleration decomposition during a rough road event misclassified as collision by a model that does not use decomposition. Lateral acceleration comprises a measured lateral acceleration. Macroscopic acceleration comprises a coarse lateral acceleration derived from coarse behavior data. Lateral perturbation comprises an acceleration plot derived from lateral acceleration and macroscopic acceleration. In the example shown, the vehicle is going straight and crosses a railroad track that intersects the road not exactly perpendicular but at an angle. The railroad track makes the vehicle rock laterally back and forth while driving over it. The macroscopic lateral acceleration is close to zero as there is no turning. The lateral perturbation shows an oscillation around zero with multiple peaks spanning for around 3 seconds, reaching maximum magnitude values around the center, which is a typical signature of a rough road or an uneven surface rather than an impact.

Figure 20:
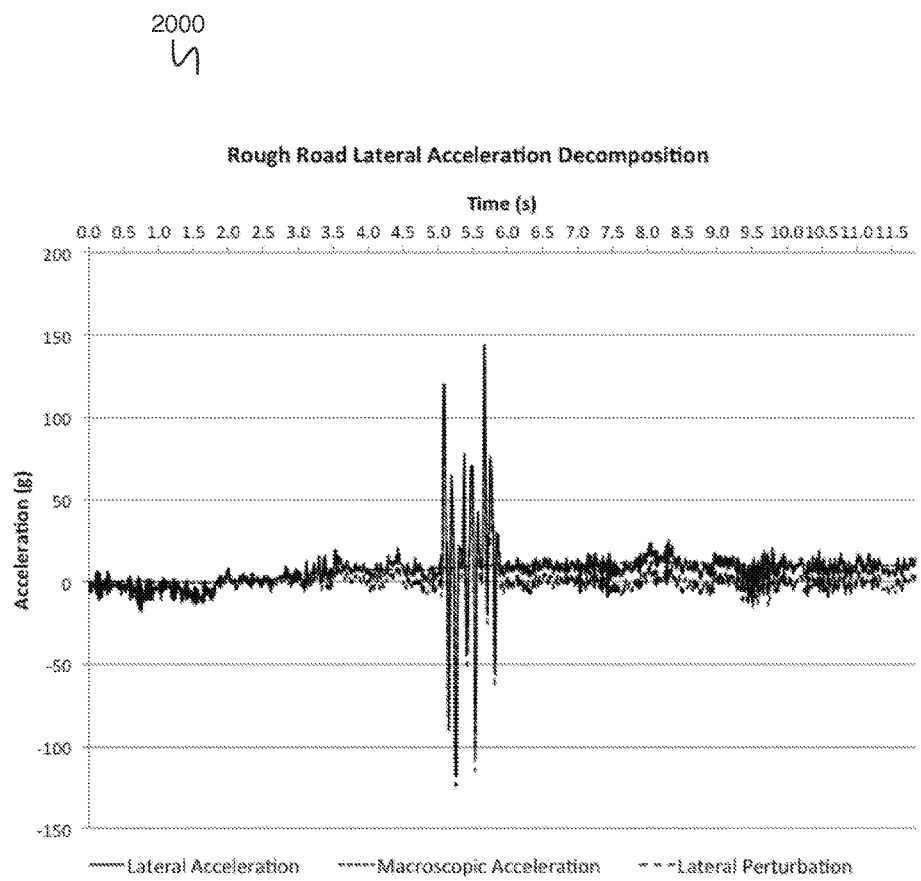
FIG. 20 is a diagram illustrating an embodiment of an acceleration plot.

FIG. 20 is a diagram illustrating an embodiment of an acceleration plot. In some embodiments, acceleration plot 2000 comprises a lateral acceleration decomposition plot measured by a vehicle event recorder (e.g., vehicle event recorder 200 of FIG. 2). In the example shown, acceleration plot 2000 shows a plot of an acceleration decomposition during a rough road event misclassified as a collision by a model that does not use decomposition. Lateral acceleration comprises a measured lateral acceleration. Macroscopic acceleration comprises a coarse lateral acceleration derived from coarse behavior data. Lateral perturbation comprises an acceleration plot derived from lateral acceleration and macroscopic acceleration. In the example shown, the vehicle is entering the freeway on an on-ramp to the right where there is a change in the pavement type. The macroscopic lateral acceleration is positive showing a turn to right. The perturbation rapidly oscillates around zero for around 1 second due to vehicle vibration caused by the transitioning between different pavement types.

Figure 21:
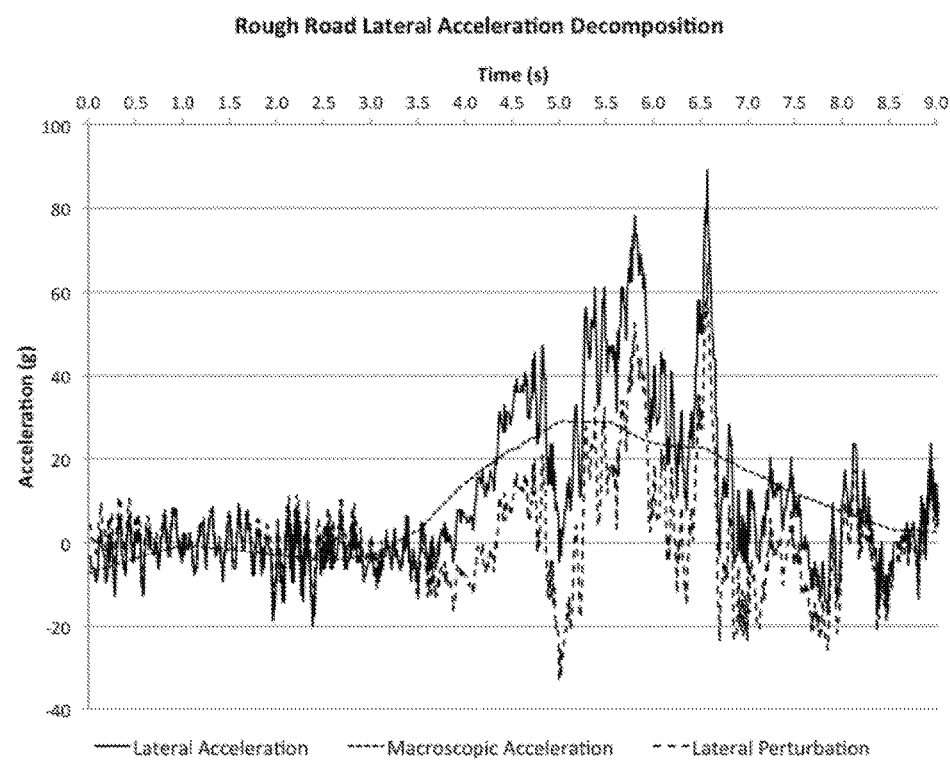
FIG. 21 is a diagram illustrating an embodiment of an acceleration plot.

FIG. 21 is a diagram illustrating an embodiment of an acceleration plot. In some embodiments, acceleration plot 2100 comprises a lateral acceleration decomposition plot measured by a vehicle event recorder (e.g., vehicle event recorder 200 of FIG. 2). In the example shown, acceleration plot 2100 shows a plot of an acceleration decomposition during a rough road event misclassified as collision by a model that does not use decomposition. Lateral acceleration comprises a measured lateral acceleration. Macroscopic acceleration comprises a coarse lateral acceleration derived from coarse behavior data. Lateral perturbation comprises an acceleration plot derived from lateral acceleration and macroscopic acceleration. In the example shown, the vehicle is turning right into another road, and there is a kind of depressed area in the transition that makes the vehicle rock right and left for a while. The macroscopic lateral acceleration is positive showing turn to the right. The perturbation oscillates around zero (more slowly than in plot 2000 of FIG. 20) for around 4 seconds due to the vehicle rocking.

In some embodiments, a model built using the overall lateral acceleration as input can misclassify rough road incidents as cornering or collisions. When a vehicle is turning and leaving for example one road to enter another road, a parking lot, a gas station or other, the transition often contains an uneven surface that is sensed by the accelerometer as a high lateral G-force, which gets misclassified as a cornering or collision. However, once the macroscopic acceleration is subtracted, it is seen that specific signatures in the lateral perturbation can be used to differentiate those scenarios. For example, a rough road is characterized by an oscillatory perturbation around 0 and amplitude higher than the standard noise, whereas a lateral impact will contain up-front a main perturbation positive or negative depending on the side of impact.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for decoupling accelerometer signals, comprising:
    an interface configured to:
        receive accelerometer data; and
        receive coarse behavior data; and
    a processor configured to:
        determine a coarse acceleration based at least in part on the coarse behavior data;
        determine a perturbation acceleration using the coarse acceleration and the accelerometer data; and
        determine an anomalous event based at least in part on the perturbation acceleration.

2. The system of claim 1, wherein the coarse behavior data comprises GPS data.

3. The system of claim 1, wherein the coarse behavior data comprises speedometer data.

4. The system of claim 1, wherein the coarse behavior data comprises gyroscope data.

5. The system of claim 1, wherein determining the coarse acceleration based at least in part on the coarse behavior data comprises taking a first derivative of the coarse behavior data.

6. The system of claim 1, wherein determining the coarse acceleration based at least in part on the coarse behavior data comprises taking a second derivative of the coarse behavior data.

7. The system of claim 1, wherein determining the coarse acceleration based at least in part on the coarse behavior data comprises filtering the coarse behavior data.

8. The system of claim 1, wherein determining the coarse acceleration based at least in part on the coarse behavior data comprises changing a sample rate of the coarse behavior data.

9. The system of claim 1, wherein determining the coarse acceleration based at least in part on the coarse behavior data comprises scaling the coarse behavior data.

10. The system of claim 9, wherein the processor is further configured to determine a scaling factor.

11. The system of claim 1, wherein determining the coarse acceleration based at least in part on the coarse behavior data comprises aligning the coarse behavior data in a time axis using one or multiple reference points.

12. The system of claim 1, wherein determining the perturbation acceleration using the coarse acceleration comprises subtracting the coarse acceleration from the accelerometer data.

13. The system of claim 1, wherein determining the anomalous event based at least in part on the perturbation acceleration comprises determining that a magnitude of the perturbation acceleration crosses an anomaly threshold value.

14. The system of claim 1, wherein determining the anomalous event based at least in part on the perturbation acceleration comprises analyzing the perturbation acceleration to determine a noisy perturbation component.

15. The system of claim 14, wherein the processor is further configured to determine an anomaly threshold value based at least in part on the noisy perturbation component.

16. The system of claim 14, wherein determining the anomalous event based at least in part on the perturbation acceleration comprises subtracting the noisy perturbation component from the perturbation acceleration.

17. The system of claim 1, wherein determining the anomalous event based at least in part on the perturbation acceleration comprises analyzing the perturbation acceleration using a machine learning model.

18. The system of claim 1, wherein the accelerometer data and the coarse behavior data comprise forward motion data.

19. The system of claim 1, wherein the accelerometer data and the coarse behavior data comprise lateral motion data.

20. A method for decoupling accelerometer signals, comprising:
- receiving accelerometer data;
- receiving coarse behavior data;
- determining, using a processor, a coarse acceleration based at least in part on the coarse behavior data;
- determining a perturbation acceleration using the coarse acceleration and the accelerometer data; and
- determining an anomalous event based at least in part on the perturbation acceleration.

21. A computer program product for decoupling accelerometer signals, the computer program product being embodied in a non-transitory computer readable storage medium and comprising computer instructions for:
- receiving accelerometer data;
- receiving coarse behavior data;
- determining a coarse acceleration based at least in part on the coarse behavior data;
- determining a perturbation acceleration using the coarse acceleration and the accelerometer data; and
- determining an anomalous event based at least in part on the perturbation acceleration.

* * * * *

UNITED STATES PATENT AND TRADEMARK OFFICE
CERTIFICATE OF CORRECTION

PATENT NO. : 10,072,933 B1
APPLICATION NO. : 15/481379
DATED : September 11, 2018
INVENTOR(S) : Gabriela Surpi It is certified that error appears in the above-identified patent and that said Letters Patent is hereby corrected as shown below:

In the Specification

In Column 7, Line 30, delete "forward_acceleration" and insert --forward acceleration--, therefor.

Signed and Sealed this
Fifteenth Day of January, 2019

Andrei Iancu
*Director of the United States Patent and Trademark Office*